United States Patent
Ekkisogloy et al.

(10) Patent No.: US 8,705,973 B2
(45) Date of Patent: *Apr. 22, 2014

(54) OPTICAL TRANSCEIVER WITH OFF-TRANSCEIVER LOGGING MECHANISM

(75) Inventors: Luke M. Ekkisogloy, San Jose, CA (US); Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 1979 days.

This patent is subject to a terminal disclaimer.

(21) Appl. No.: 11/220,770

(22) Filed: Sep. 7, 2005

(65) Prior Publication Data

US 2006/0051099 A1    Mar. 9, 2006

Related U.S. Application Data

(60) Provisional application No. 60/607,538, filed on Sep. 7, 2004.

(51) Int. Cl.
  *H04B 10/02* (2011.01)
  *H04B 10/08* (2011.01)

(52) U.S. Cl.
  USPC .......................................... 398/135; 398/22

(58) Field of Classification Search
  USPC ............................................ 398/135–139, 22
  See application file for complete search history.

(56) References Cited

U.S. PATENT DOCUMENTS

| | | | |
|---|---|---|---|
| 4,784,454 A | 11/1988 | Dyott | |
| 4,903,262 A | 2/1990 | Dissosway et al. | |
| 5,019,769 A | 5/1991 | Levinson | |
| 5,035,481 A | 7/1991 | Mollenauer | |
| 5,144,632 A | 9/1992 | Thonn | |
| 5,812,572 A | 9/1998 | King et al. | |
| 6,400,737 B1 | 6/2002 | Broulin et al. | |
| 6,512,617 B1 * | 1/2003 | Tanji et al. | 398/137 |
| 6,590,644 B1 | 7/2003 | Coin et al. | |
| 6,618,425 B1 | 9/2003 | Carlesi et al. | |
| 6,898,702 B1 | 5/2005 | Evans | |
| 6,978,624 B2 | 12/2005 | Carlson et al. | |
| 7,215,891 B1 * | 5/2007 | Chiang et al. | 398/137 |
| 7,249,353 B2 * | 7/2007 | Zarco | 717/171 |

(Continued)

FOREIGN PATENT DOCUMENTS

| | | |
|---|---|---|
| CN | 200680038499.9 | 11/2010 |
| CN | 200680038499.9 | 3/2012 |

OTHER PUBLICATIONS

U.S. Appl. No. 10/882,447, filed Jun. 30, 2004, Luke M. Ekkizogloy, et al.

(Continued)

*Primary Examiner* — Daniel Dobson
(74) *Attorney, Agent, or Firm* — Maschoff Brennan

(57) ABSTRACT

A mechanism for an optical transceiver to log information about its operational parameters to an off transceiver host computing system (hereinafter referred to simply as a "host"). The optical transceiver may be communicatively coupled to the host. The optical transceiver is configured to identify operational information regarding itself. The operational information may include statistical data about operation, or may include measured parameters. The optical transceiver may log the information to the memory of the host in an off transceiver logging operation.

13 Claims, 2 Drawing Sheets

(56) References Cited

U.S. PATENT DOCUMENTS

| | | | |
|---|---|---|---|
| 7,346,764 B2 | 3/2008 | Moriwaki et al. | |
| 7,493,048 B2 * | 2/2009 | Dybsetter et al. | 398/136 |
| 7,653,314 B2 * | 1/2010 | Dybsetter et al. | 398/135 |
| 8,582,978 B2 * | 11/2013 | Ekkizogloy et al. | 398/182 |
| 2002/0027688 A1 | 3/2002 | Stephenson | |
| 2002/0078403 A1 | 6/2002 | Gullo et al. | |
| 2002/0097468 A1 | 7/2002 | Mecherle et al. | |
| 2002/0143920 A1 | 10/2002 | Dev et al. | |
| 2003/0041127 A1 * | 2/2003 | Turnbull | 709/220 |
| 2003/0053170 A1 * | 3/2003 | Levinson et al. | 359/152 |
| 2003/0128411 A1 | 7/2003 | Aronson et al. | |
| 2003/0223756 A1 | 12/2003 | Tatum et al. | |
| 2004/0022537 A1 | 2/2004 | Mecherle et al. | |
| 2004/0022543 A1 | 2/2004 | Hosking et al. | |
| 2004/0028408 A1 * | 2/2004 | Cox et al. | 398/66 |
| 2004/0033079 A1 | 2/2004 | Sheth et al. | |
| 2004/0057730 A1 | 3/2004 | Littlejohn et al. | |
| 2004/0091005 A1 * | 5/2004 | Hofmeister et al. | 372/34 |
| 2004/0103441 A1 * | 5/2004 | Williams | 725/121 |
| 2004/0120323 A1 * | 6/2004 | Viikari et al. | 370/395.5 |
| 2004/0136719 A1 | 7/2004 | Hidai et al. | |
| 2004/0175172 A1 | 9/2004 | Aronson et al. | |
| 2004/0183787 A1 * | 9/2004 | Geaghan et al. | 345/173 |
| 2005/0017751 A1 | 1/2005 | Gunn et al. | |
| 2005/0047778 A1 | 3/2005 | Levinson | |
| 2005/0063711 A1 * | 3/2005 | Rossi et al. | 398/198 |
| 2005/0078916 A1 | 4/2005 | Hosking | |
| 2005/0105915 A1 | 5/2005 | Light | |
| 2005/0111845 A1 * | 5/2005 | Nelson et al. | 398/138 |
| 2005/0216560 A1 * | 9/2005 | Pohja et al. | 709/205 |
| 2005/0223208 A1 * | 10/2005 | Moran et al. | 713/1 |
| 2005/0265717 A1 * | 12/2005 | Zhou | 398/9 |
| 2005/0282413 A1 | 12/2005 | Israel et al. | |
| 2006/0002707 A1 | 1/2006 | Ekkizogloy et al. | |
| 2006/0002708 A1 | 1/2006 | Hahin | |
| 2006/0002709 A1 | 1/2006 | Dybsetter et al. | |
| 2006/0002710 A1 | 1/2006 | Dybsetter et al. | |
| 2006/0018664 A1 * | 1/2006 | Levinson et al. | 398/135 |
| 2006/0034612 A1 | 2/2006 | Yu et al. | |
| 2006/0098699 A1 * | 5/2006 | Sanchez | 372/26 |
| 2006/0147215 A1 | 7/2006 | Hahin et al. | |
| 2007/0280591 A1 | 12/2007 | Nelson et al. | |
| 2008/0292311 A1 | 11/2008 | Daghighian | |

OTHER PUBLICATIONS

U.S. Appl. No. 10/883,208, filed Jun. 30, 2004, Jayne C. Hahin, et al.
U.S. Appl. No. 10/883,209, filed Jun. 30, 2004, Dybsetter et al.
U.S. Appl. No. 11/468,246, filed Aug. 29, 2006, Dybsetter et al.
U.S. Appl. No. 12/015,240, filed Jan. 16, 2008, Ekkizogloy et al.
U.S. Appl. No. 10/883,209, Aug. 5, 2005, Office Action.
U.S. Appl. No. 10/883,209, Mar. 24, 2006, Final Office Action.
U.S. Appl. No. 10/883,209, Apr. 10, 2007, Office Action.
U.S. Appl. No. 10/883,209, Oct. 30, 2007, Office Action.
U.S. Appl. No. 10/883,209, Jun. 9, 2008, Final Office Action.
U.S. Appl. No. 11/468,246, Sep. 10, 2009, Notice of Allowance.
U.S. Appl. No. 11/468,246, Mar. 19, 2009, Office Action.
U.S. Appl. No. 10/883,209, Nov. 21, 2008, Notice of Allowance.
U.S. Appl. No. 12/015,240, Oct. 4, 2010, Office Action.
U.S. Appl. No. 60/717,594, filed Sep. 16, 2005, Hahin.
U.S. Appl. No. 12/015,240 Office Action mailed May 16, 2011.
U.S. Appl. No. 10/883,209, Oct. 8, 2008, Notice of Allowance.
U.S. Appl. No. 12/015,240, Nov. 25, 2011, Office Action.
U.S. Appl. No. 12/015,240, May 8, 2012, Office Action.
U.S. Appl. No. 10/883,208, Mar. 8, 2007, Office Action.
U.S. Appl. No. 10/883,208, Oct. 30, 2007, Office Action.
U.S. Appl. No. 10/883,208, Apr. 16, 2008, Office Action.
U.S. Appl. No. 10/883,208, Dec. 5, 2008, Office Action.
U.S. Appl. No. 10/883,208, Jul. 21, 2009, Office Action.
U.S. Appl. No. 10/883,208, Jan. 7, 2010, Notice of Allowance.
U.S. Appl. No. 10/882,447, Jun. 7, 2005, Office Action.
U.S. Appl. No. 10/882,447, Mar. 20, 2006, Office Action.
U.S. Appl. No. 10/882,447, Mar. 13, 2007, Office Action.
U.S. Appl. No. 10/882,447, Sep. 28, 2007, Office Action.
U.S. Appl. No. 10/882,447, May 12, 2008, Office Action.
U.S. Appl. No. 10/882,447, Nov. 17, 2008, Notice of Allowance.

* cited by examiner

OPTICAL TRANSCEIVER WITH OFF-TRANSCEIVER LOGGING MECHANISM

CROSS-REFERENCE TO RELATED APPLICATIONS

This application claims the benefit of U.S. Provisional Application No. 60/607,538, filed Sep. 7, 2004, which is incorporated herein by reference in its entirety.

BACKGROUND OF THE INVENTION

1. The Field of the Invention

The present invention relates generally to optical transceivers. More specifically, the present invention relates to optical transceivers that perform logging of operational information to a host computing system.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier.

The operation of optical transceiver is susceptible to its operating environment and to its other operational parameters. One obvious example is the laser bias current. If the transmitter bias current drifts upwards or downwards, a variation in the optical intensity generated by the transmitter may be expected. The transmitted optical power and the received optical power are also important operational parameters. The supply voltage level provided to the optical transceiver also affects its performance.

In addition, temperature can change the operating characteristics of the optical transmitter itself. In particular, the wavelength output of a laser may drift from approximately 0.3 nanometers (nm) to approximately 0.6 nm for every one degree Celsius change in temperature. Since lasers generate heat during operation, this can have a significant effect upon the operation of the laser. Wavelength variations can cause crosstalk, where one transmission becomes confused with another. Furthermore, varying wavelengths due to varying laser temperature may cause different fiber attenuations. Accordingly, laser temperature and wavelength have great influence over the proper operation of the optical transceiver.

High temperatures of the optical transceiver itself may cause temporary or even permanent malfunctioning of not just the laser, but the other electronic components within the optical transceiver. Accordingly, the temperature of the optical transceiver as a whole is also important to the operation of the optical transceiver.

In order to provide proper cooling or heating to the optical transceiver and/or laser, Thermo Electric Coolers (TECs) are often employed, particularly in optical transceivers whose performance is highly temperature-dependent. Such TEC coolers heat or cool depending on the direction and magnitude of current applied to the TEC coolers. Accordingly, the TEC current is also an important operational parameter.

These various parameters (e.g., laser bias current, transmit power, receive power, supply voltage, laser wavelength, laser temperature, transceiver temperature, and TEC current, and the like) are thus important to the operation of the optical transceiver. However, after an optical transceiver malfunctions, it is often difficult to diagnose what the problem has been since there is no conventional mechanism for logging important events that may give an indication as to why the transceiver malfunctioned. For example, if an optical transceiver has an upper temperature rating of 85 degrees Celsius, the optical transceiver may malfunction or even permanently break if its temperature reaches 110 degrees Celsius. Yet, after the fact, it may be difficult to discover that the optical transceiver was subjected to improper temperatures.

Therefore, what would be advantageous is a mechanism for logging events that are important to the operation of an optical transceiver so that these events may be later used to understand the conditions under which the optical transceiver operated.

BRIEF SUMMARY OF THE INVENTION

The foregoing problems with the prior state of the art are overcome by the principles of the present invention, which relate to a method for an optical transceiver to log information about its operational parameters to the memory of a host computing system that is communicatively coupled to the optical transceiver. The optical transceiver includes a system memory and at least one processor.

The processor executes microcode in the system memory. The executed microcode causes the optical transceiver to first identify what operational information to log. Next, the optical transceiver provides the logged operational information to the memory of the host computing system.

The operational information may include operational data such as, for example, the total operational time, a number of times the optical transceiver has been booted, an average operational time between boots, a total number of error conditions encountered, an identification of one or more error conditions encountered, a categorization of the number of error conditions encountered for a plurality of different error types, or the like. The operational information may also include operational measurements along with the time of measurement. The measured items may include a laser wavelength, a laser temperature, a supply voltage, a transceiver temperature, a laser bias current measurement, a Thermo Electric Cooler (TEC) current measurement, a transmit power measurement, a receive power measurement, or the like. For a given operational parameter, the log entries may be made periodically, and/or in response to certain events.

Accordingly, the present invention has many advantages. Specifically, the present invention provides for greater logging capacity of optical transceiver parameters, as storage memory is primarily provided by the external host. This saves precious internal transceiver memory for other purposes. Additionally, the present invention allows for direct user control of the logging process. For example, a user has the ability to select which transceiver parameters to measure based on the microcode that the transceiver executes. In some embodiments, remote control of the logging process and remote evaluation of the logged information are possible using the internet or other wide area network. In another embodiment, the user may direct that some of the logged information be stored in both the host memory and the transceiver persistent memory. This creates a redundant backup that ensures the stored data is protected should there be a failure in either of the memories.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to a mechanism for an optical transceiver to log information about its operational parameters to an off transceiver host computing system (hereinafter referred to simply as a "host"). The optical transceiver may be communicatively coupled to the host. The optical transceiver is configured to identify operational information regarding itself. The operational information may include statistical data about operation, or may include measured parameters. The optical transceiver may log the information to the memory of the host in an off transceiver logging operation. An example operational optical transceiver environment will first be described. Then, the operation in accordance with the invention will be described with respect to the operational environment.

Figure 1:
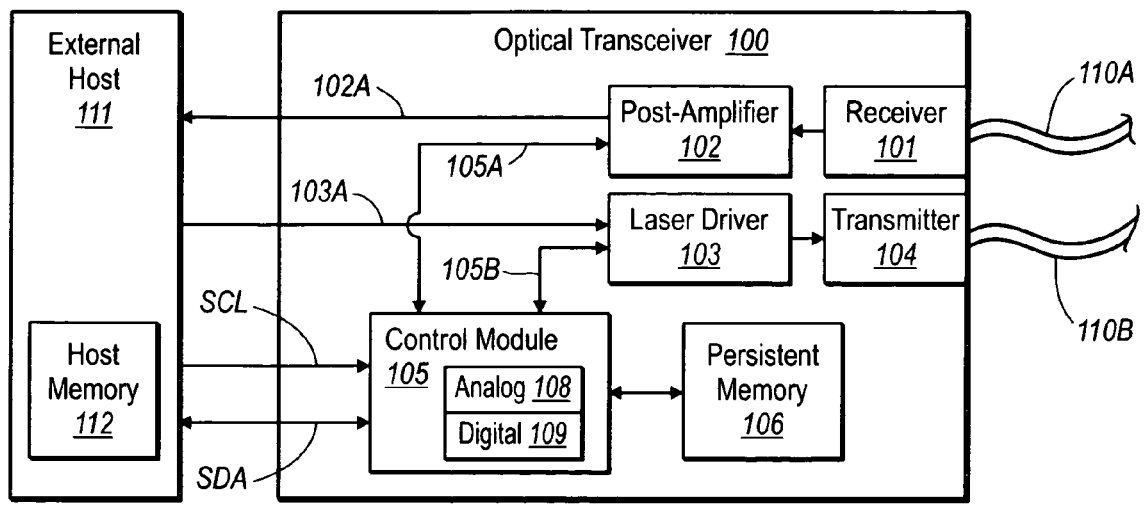
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 10B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
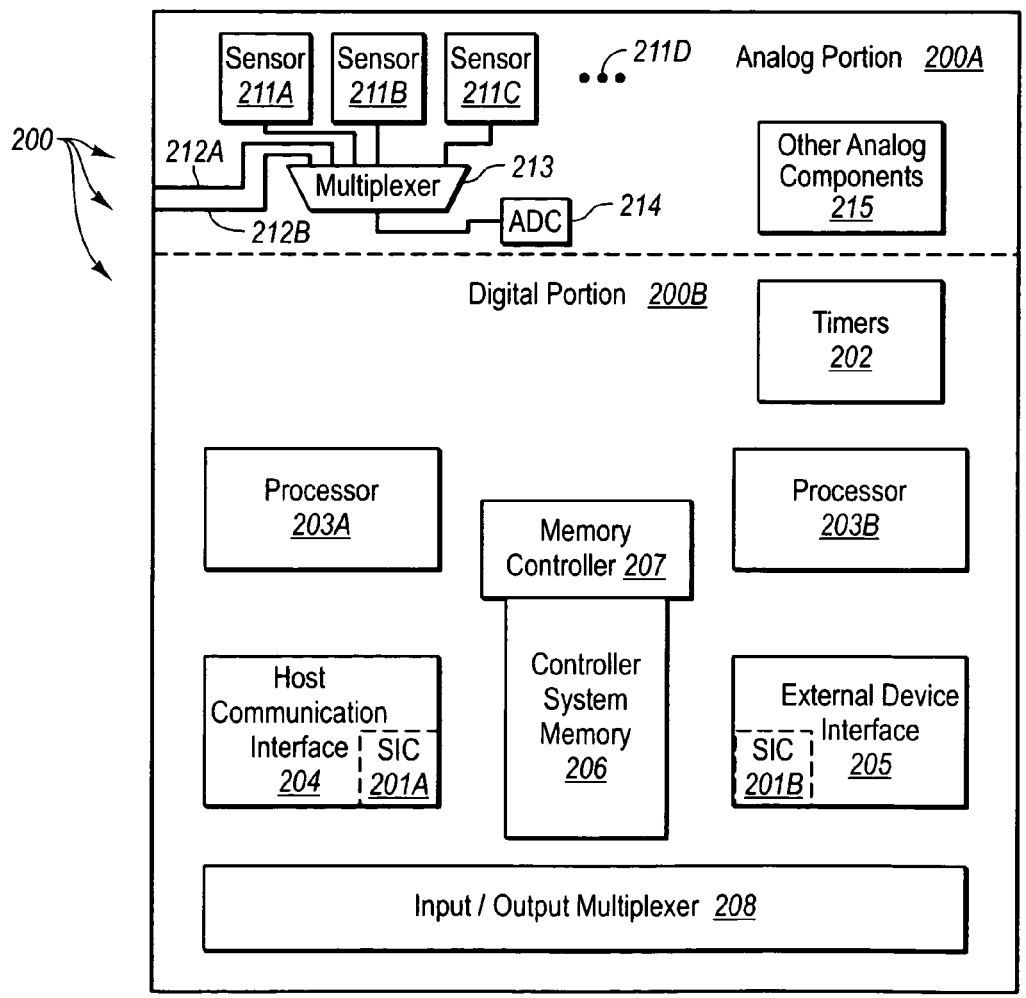
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment.

In accordance with the present invention, the optical transceiver 100 logs operational information to the host memory 112 within the external host 111. This may be accomplished in a number of ways using the environment described and illustrated with respect to FIGS. 1 and 2.

In one embodiment, the external host 111 at least partially controls the logging of various operational parameters of the transceiver 100. In this case, the external host 111 provides instructions to the optical transceiver 100. For example, the instructions may be sent to optical transceiver 100 through the use of serial data line SDA and serial clock line SCL or another implemented host interface. These instructions may indicate, for example, what information is to be logged, instructions for how to perform the off transceiver logging operation, or may even include microcode that may be directly executed by the optical transceiver. In addition, the instructions from external host 111 may indicate when to store logged data in external host memory 112.

Referring to FIGS. 1 and 2, control module 105 executes microcode received from a source. Specifically, processors 203A and 203B load microcode from the source into the controller system memory 206. For example, the processors 203 may load microcode stored in optical transceiver persistent memory 106 into controller system memory 206. The microcode from persistent memory 106 may include functions that direct which transceiver operational parameters to measure. Alternatively, the microcode may be provided by the external host 111, delivered to control module 105 over serial data line SDA or other implemented host interface. For example, external host memory 112 may contain a library of different microcode functions. A user would interface with host 111 and choose which microcode function to run based on the desired parameters to measure. In addition, external host 111 may be connected to the internet or some other wide area network, allowing processors 203 to acquire microcode from a remote source. This connection can be achieved by any standard internet or wide area network protocol.

Figure 3:
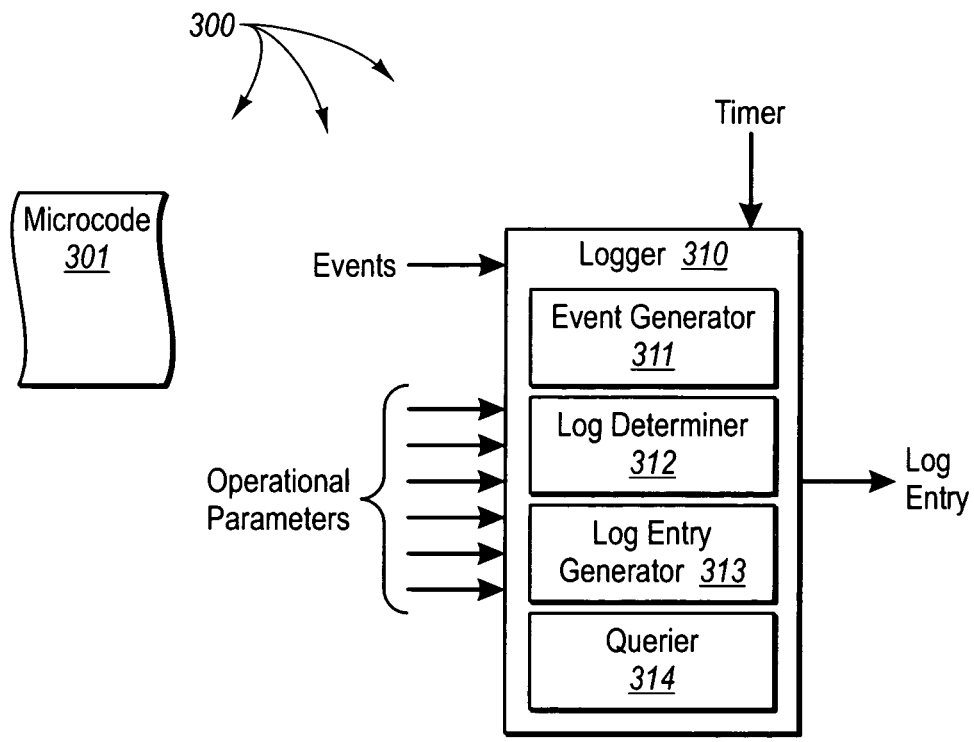
FIG. 3 illustrates a software architecture that may be maintained in controller system memory during run-time in accordance with the principles of the present invention.

Referring to FIG. 3, an illustration of a software architecture 300 that may be instantiated in controller system memory 206 is depicted. In particular, the processors 203 load microcode 301 from any of the sources previously discussed into the controller system memory 206. The processors 203 then execute the microcode instructions 301. This causes the microcode to form a functional logger object 310 in system memory.

The logger object 310 has access to various operational parameters of the optical transceiver for example, from the ADC 214 or from the external lines 212A and 212B. The logger 310 also may have access to events such as the events generated by the high-speed comparators mentioned above. The logger 310 may also generate its own internal events as represented by events generator 311 based on an evaluation of one or more of the operational parameters. A log determiner 312 identifies what operational information should be logged, and when. A log entry generator 313 generates the log entries. A queries component 314 may be used to query various portions of the optical transceiver for operational parameters. The logger 310 may also have access to timing signals.

Figure 4:
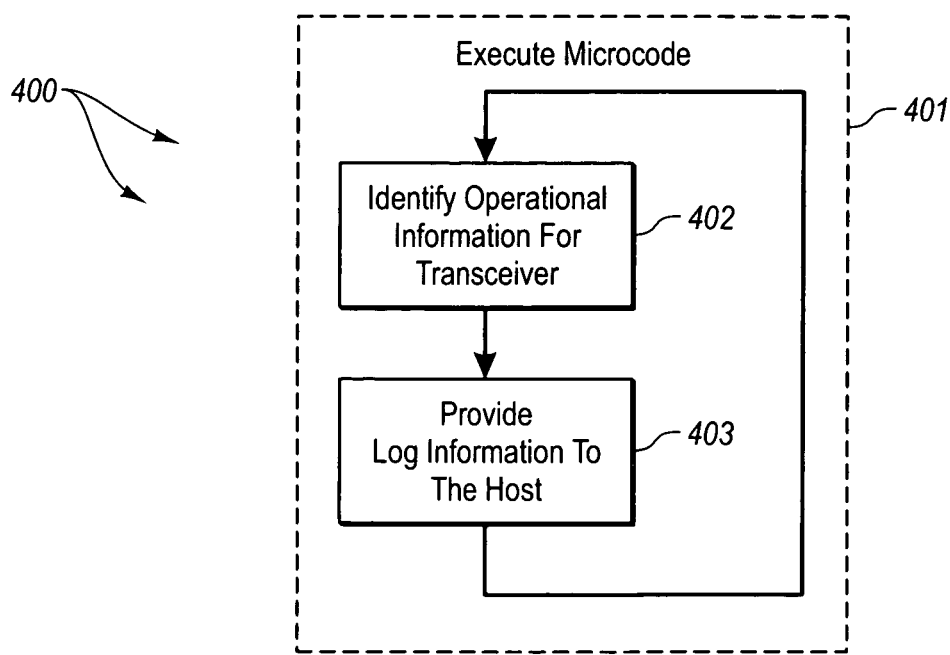
FIG. 4 illustrates a flowchart of a method for logging operational information to a host computing system in accordance with the principles of the present invention.

FIG. 4 illustrates a flowchart of a method 400 for an optical transceiver to log operational information in the memory of a host computing system. The optical transceiver executes microcode, which may correspond to microcode 301, from system memory (act 401). The executed microcode causes the optical transceiver to perform the logging operation, which may be repeated during operation numerous times as represented by the solid black lines.

After execution of the microcode, the optical transceiver identifies which operational parameters to log (act 402). For example, a functional logger, which may correspond to functional logger 310, is created in controller system memory as discussed. The functional logger identifies which optical transceiver operational parameters to log. For example, the parameters to log may be identified by a default setting determined by the microcode instruction (e.g. microcode 301) loaded into the controller system memory 206. The default setting may indicate that all optical transceiver operational parameters are to be logged. Alternatively, the default setting may indicate that only certain operational parameters, for example fluctuations of temperature, are to be logged. Additionally, the parameters to log may be identified by customized instructions from the host. For example, external host 111 may be equipped with a keyboard, mouse or other user interface that allows a user to choose which parameter to measure.

The logger may also be directed to log data based on a processed result, such as the current run time. The logger may also receive instructions providing conditions as to when to log data. For example, if the persistent memory is greater than 80% full, then the log condition may specify that all data is logged, or if the persistent memory is less than 80% full, then the log condition may specify that a specific operational parameter is logged.

The operational information that may be logged may include statistical information such as, for example, a total operational time, an average operational time between boots, a total number of error conditions encountered, an identification of one or more error conditions encountered, a categorization of the number of error conditions encountered for a plurality of different error types, a number of times the optical transceiver has been booted, or the like. The operational information may also simply record operational parameters measured along with an approximate time of measurement. Such operational parameters may include, for example, a laser wavelength approximation, a laser temperature measurement, a supply voltage measurement, a transceiver temperature measurement, a laser bias current measurement, a Thermo Electric Cooler (TEC) current measurement, a transmit power measurement, a receive power measurement, an acceleration measurement, a peak acceleration measurement, or the like. In addition, additional statistical information regarding an end of life for the optical transceiver may be logged. For example, the end of life information may include calculations using statistical models based on operational parameters that calculate the increasing likelihood of transceiver failure as the transceiver ages. Use of the calculations advantageously allows a user the ability to optimally replace an aging transceiver with minimal loss of use of the transceiver.

Once the operational parameters are identified, the optical transceiver is configured by the executed microcode to write the corresponding logged information to the host (act 403). For example, microcode, such as microcode 301, may direct that at least some portion of the logged information be sent over the SDA line or other host interface to host memory 112 for storage, allowing user access and evaluation of the information. Additionally, if host 111 is connected to the internet or other wide area network, the logged information may be uploaded from host memory 112 to a remote evaluation center using any standard internet or network protocol. In other embodiments, the logged information may be stored on a mobile storage device such as a DVD or CD ROM and sent to the remote evaluation center using traditional mail service. In either case, if an optical transceiver failure were to occur, the various log entries could be evaluated to identify possible causes for the failure. For example, if an event was recorded indicating that the optical transceiver experienced a peak acceleration exceeding 20 times the acceleration imposed by gravity (often referred to as "G's"), then one might infer that the optical transceiver had been dropped.

Alternatively, optical transceiver 100 may be configured to send all the logged information to both host memory 112 and to transceiver persistent memory 106. This would allow retrieval and evaluation of the stored data from either memory source and would create a backup should one of the memory sources become disabled. It may also be possible to configure optical transceiver 100 to send all the logged data to host memory 112 and a portion to persistent memory 106. For example, persistent memory 106 could be used to permanently store diagnostic information about optical transceiver 100. This would allow analysis of possible causes of optical transceiver failure should external host 111 become separated from optical transceiver 100.

If the persistent memory 106 was a separate module such as, for example, an EEPROM module, the persistent memory 106 could be unplugged from the optical transceiver 100 to evaluate its memory contents. Alternatively, the persistent memory 106 could be evaluated without removal from the optical transceiver 100 if the optical transceiver has an external I/O interface that allows the persistent memory 106 to be read.

The principles of the present invention provide for an optical transceiver with many benefits over current transceivers. Specifically, the present invention provides for greater logging capacity of optical transceiver parameters, as storage memory is primarily provided by an external host. This saves precious internal transceiver memory for other purposes.

Additionally, the present invention allows for direct user control of the logging process. For example, a user has the ability to select which transceiver parameters to measure based on the microcode that the logger executes. The user also has the ability to easily evaluate the logged data stored in the host memory. In some embodiments, remote control of the logging process and remote evaluation of the logged information are possible using the internet or other wide area network. In another embodiment, the user may direct that some of the logged information be stored in both the host memory and the transceiver persistent memory. This creates a redundant backup that ensures the stored data is protected should there be a failure in either of the memories. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for an optical transceiver to log operational data, the method comprising the following:
   an act of the optical transceiver identifying first operational information regarding the optical transceiver, the optical transceiver having a transmitter and a receiver that are coupled to a host computing system via a first host communication interface, the optical transceiver also coupled to the host computing system via a second host communication interface that is separate from the first host communication interface;
   after the act of identifying the first operational information, an act of the optical transceiver writing redundant copies of first log information representing the first operational information to a persistent memory of the optical transceiver and to a memory within the host computing system via the second host communication interface;
   an act of the optical transceiver identifying second operational information regarding the optical transceiver; and
   after the act of identifying the second operational information, an act of the optical transceiver writing redundant copies of second log information representing the second operational information to the persistent memory of the optical transceiver and to the memory within the host computing system via the second host communication interface,
   wherein the method is performed by a control module within the optical transceiver, and the control module and the persistent memory are integrated on the same chip.

2. A method in accordance with claim 1, wherein the logged operational information is used to diagnose operational failures in the optical transceiver.

3. A method in accordance with claim 1 wherein the logged information is uploaded from the host computing system to a remote evaluation center, the remote evaluation center being coupled to the host computing system using a network protocol.

4. A method in accordance with claim 1 wherein the logged information is sent from the host computing system to a remote evaluation center using traditional mail service.

5. A method in accordance with claim 1, wherein the first operational information represents one or more of a total operation time for the optical transceiver, a number of times the optical transceiver has been booted, an average operational time between boots, a total number of error conditions encountered, an identification of one or more error conditions encountered, a categorization of the number of error conditions encountered for a plurality of different error types, a laser wavelength approximation, a laser temperature measurement, a supply voltage measurement, a transceiver temperature measurement, a laser bias current measurement, a TEC current measurement, a transmit power measurement, a receive power measurement an acceleration measurement, and an end of life calculation.

6. A method in accordance with claim 1, wherein the second operational information comprises one or more measured operational parameters of the optical transceiver.

7. An optical transceiver comprising the following:
   at least one processor;
   a persistent memory; and
   a system memory configurable to contain microcode that is user-selected from a library of microcode stored in a memory of a host computing system coupled to the optical transceiver;
   wherein the at least one processor is configured to execute the microcode in the system memory, the microcode configured such that when executed by the at least one processor, the microcode causes the optical transceiver to identify operational information regarding the optical transceiver, and record only a portion of a log information representing the operational information to the persistent memory and record the entire log information representing the operational information to a memory of a host computing system coupled to the optical transceiver.

8. An optical transceiver in accordance with claim 7, wherein the operational information represents one or more of a total operation time for the optical transceiver, a number of times the optical transceiver has been booted, an average operational time between boots, a total number of error conditions encountered, an identification of one or more error conditions encountered, a categorization of the number of error conditions encountered for a plurality of different error types, a laser wavelength approximation, a laser temperature measurement, a supply voltage measurement, a transceiver temperature measurement, a laser bias current measurement, a TEC current measurement, a transmit power measurement, a receive power measurement, an acceleration measurement, and an end of life calculation.

9. An optical transceiver in accordance with claim 7, wherein the log information representing the operational information is uploaded from the host computing system to a remote evaluation center, the remote evaluation center being coupled to the host computing system using a network protocol.

10. An optical transceiver in accordance with claim 7, wherein the log information representing the operational information is sent from the host computing system to a remote evaluation center using traditional mail service.

11. An optical transceiver in accordance with claim 7, wherein the optical transceiver is one of a 1G laser transceiver, a 2G laser transceiver, a 4G laser transceiver, a 8G laser transceiver, or a 10G laser transceiver.

12. An optical transceiver in accordance with claim 7, wherein the optical transceiver is a laser transceiver suitable for fiber optic links greater than 10G.

13. An optical transceiver in accordance with claim 7, wherein the optical transceiver is one of a XFP laser transceiver, a SFP laser transceiver, or a SFF laser transceiver.

\* \* \* \* \*